(12) United States Patent
Hironaka et al.

(10) Patent No.: US 6,171,376 B1
(45) Date of Patent: Jan. 9, 2001

(54) AIR CONDITIONER WITH ELECTRONIC DUST COLLECTOR

(75) Inventors: Yasumasa Hironaka, Nara; Ayumi Tajika, Shijyonawate, both of (JP)

(73) Assignee: Funai Electric Co., Ltd. (JP)

( * ) Notice: Under 35 U.S.C. 154(b), the term of this patent shall be extended for 0 days.

(21) Appl. No.: 09/199,379

(22) Filed: Nov. 25, 1998

(30) Foreign Application Priority Data

Nov. 26, 1997 (JP) .................................................... 9-324807

(51) Int. Cl.[7] .................................................................. B03C 3/74
(52) U.S. Cl. ............................. 96/28; 55/282.3; 55/360; 55/DIG. 10
(58) Field of Search ..................... 96/15, 18, 19, 96/28, 69, 96, 83, 98, 74; 95/57, 59, 60, 68, 73, 74; 55/282.3, 360, DIG. 10, 490.1

(56) References Cited

U.S. PATENT DOCUMENTS

| | | | |
|---|---|---|---|
| 4,133,652 | 1/1979 | Ishikawa et al. | 422/4 X |
| 4,726,814 | * 2/1988 | Weitman | 96/74 X |
| 5,290,343 | * 3/1994 | Morita et al. | 96/83 X |
| 5,380,355 | * 1/1995 | Brothers | 55/360 X |
| 5,529,613 | * 6/1996 | Yavnieli | 96/96 X |

FOREIGN PATENT DOCUMENTS

| | | | |
|---|---|---|---|
| 2242152 | 3/1975 | (FR) . | |
| 2265557 | 10/1993 | (GB) . | |
| 6180127 | 6/1994 | (JP) | 55/DIG. 10 |
| 06 180128 | * 6/1994 | (JP) | 55/DIG. 10 |

* cited by examiner

*Primary Examiner*—Richard L. Chiesa
(74) *Attorney, Agent, or Firm*—Morrison Law Firm

(57) ABSTRACT

An air conditioner has an electronic dust collector incorporated in its casing. A mounting plate is grounded which, in turn, grounds the casing of the air conditioner. This reduces adsorption of dust to the casing, thereby preventing soiling of the casing with dust or fine particles.

17 Claims, 5 Drawing Sheets

AIR CONDITIONER WITH ELECTRONIC DUST COLLECTOR

BACKGROUND OF THE INVENTION

1. Field of the Invention

The present invention relates to an air conditioner with electronic dust collector.

2. Description of the Prior Art

Hitherto, there has been known an air conditioner which incorporates a deodorant device using an adsorptive catalyst or the like, in addition to the original air conditioning function, in the interior unit to enhance the function (ref. Japanese Patent Publication Unexamined HEI 6-180127). Likewise, there have been attempts to incorporate an electronic dust collector in the interior unit. The electronic dust collector generates a corona discharge by applying a high voltage between a discharge electrode and a dust collection electrode. The corona discharge ionizes fine particles and dust in the surrounding air. The dust collection electrode then adsorbs them. Among such electronic dust collectors, there has been developed a maintenance-free type one in which the dust collection electrode is provided with a heater for self-cleaning so that the dust deposited on the dust collection electrode is burned, and thereby is removed.

However, when such an electronic dust collector is incorporated in the interior unit of the air conditioner, because of the corona discharge, the body or the casing itself is charged with static electricity. This presents the problem that dust is attracted and held in the vicinity of the inside walls, especially near the air intake and outlet ports, and on outside walls of the casing, rather having it collected by the dust collection electrode. This soils these areas.

OBJECTS AND SUMMARY OF THE INVENTION

It is an object of the present invention to provide an air conditioner with electronic dust collector which solves the problems of the prior art.

It is a further object of the invention to provide an air conditioner with electronic dust collector having a constitution of the electronic dust collector incorporated in the casing of the interior unit of the air conditioner in which electrification of the casing is prevented and dust is less apt to be adsorbed to the casing, thereby preventing generation of dust.

Briefly stated, the present invention provides an air conditioner which has an electronic dust collector incorporated in its casing. A mounting plate is grounded which, in turn, grounds the casing of the air conditioner. This reduces adsorption of dust to the casing, thereby preventing soiling of the casing with dust or fine particles.

According to an embodiment of the invention, there is provided an air conditioner with electronic dust collector for conditioning air in a room and purifying air by collecting dust in air by the use of electric discharge effect, comprising: a casing having an air suction port and an air outlet port, a heat exchanger in said casing facing said air suction port, a fan for circulating air into said suction port, through air passages in said casing and said heat exchanger, and out said air outlet port, an electronic dust collector in said air passages for collecting dust in air which passes through said air passages by using said electric discharge effect; and means for grounding said casing.

According to a feature of the invention, there is provided an air conditioner with electronic dust collector for conditioning air in a room and purifying air by collecting dust in air by the use of electric discharge effect, comprising; a casing having an air suction port and an air outlet port, a heat exchanger in said casing facing said suction port, a fan for circulating air into said air suction port ,through air passages in said heat exchanger and said casing and out said air outlet port, an electronic dust collector in said air passages for collecting dust in air which passes through said air passages by using said discharge effect; and means for permitting grounding of said casing.

In order to attain the above object, the present invention in an air conditioner with electronic dust collector for conditioning air in a room and purifying air by collecting dust in air by the use of electric discharge effect, comprising: a casing having an air suction port and an air outlet port; a heat exchanger provided in said casing facing the suction port; a fan for circulating air into the suction port through the air passages and out through the outlet port in the heat exchanger and the casing; and an electronic dust collector arrayed in said air passages for collecting dust in air which passes through the air passages by using the discharge effect, so that the casing can be grounded.

In the above constitution, the air taken in from the suction port during the air conditioning operation undergoes heat exchange through the heat exchanger to be cooled or heated, and further is discharged through the air outlet port in the casing. Simultaneously, by the operation of the electronic dust collector, dust or fine particles floating in the air passing through the air passage are electrified by adhesion of ions or electrons from by the corona discharge of the dust collector, ion blow is generated, which is attracted to the dust collection electrode side of the dust collector to cause electric dust collection. Further, the casing per se tends to be electrified by the static electricity by the corona discharge of the dust collector, but when the casing is grounded, static electricity of the casing is eliminated, and accordingly, the casing is prevented from soiling with dust or fine particles. Though it is desirable for the ground resistance of the casing to be small, the ground resistance may be approximately 2 Ma or less.

The dust collector may be one comprising a discharge electrode and a dust collection electrode spaced apart a predetermined distance and between which a high voltage is applied. The dust collection electrode can include a heater for self cleaning. By this constitution, the dust collection electrode is self-cleaned to become maintenance-free. Alternatively, a catalyst layer may be provided on the surface of the dust collection electrode. With this constitution, when air contains fine particles of odorous component, the odorous component is adsorbed by the catalyst layer and deodorized.

The air conditioner body containing the above casing may be designed to permit to be fixed to a wall through a fixing plate, with the fixing plate grounded. By this constitution, just by fixing the air conditioner body to the fixing plate the grounding of the casing is easily realized, and the wall to which the air conditioner is fixed and the surroundings are made less apt to collect dust.

The above dust collector may be to be fixed to a casing through a dust collector fixing plate, so that the dust collector fixing plate can be grounded. By this constitution, static electricity on the dust collector fixing plate can be eliminated, and deposition of dust on the dust collector fixing plate per se is suppressed. At the same time, the dust collector fixing plate has a function of the shield plate for heat for the heater for self-cleaning.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
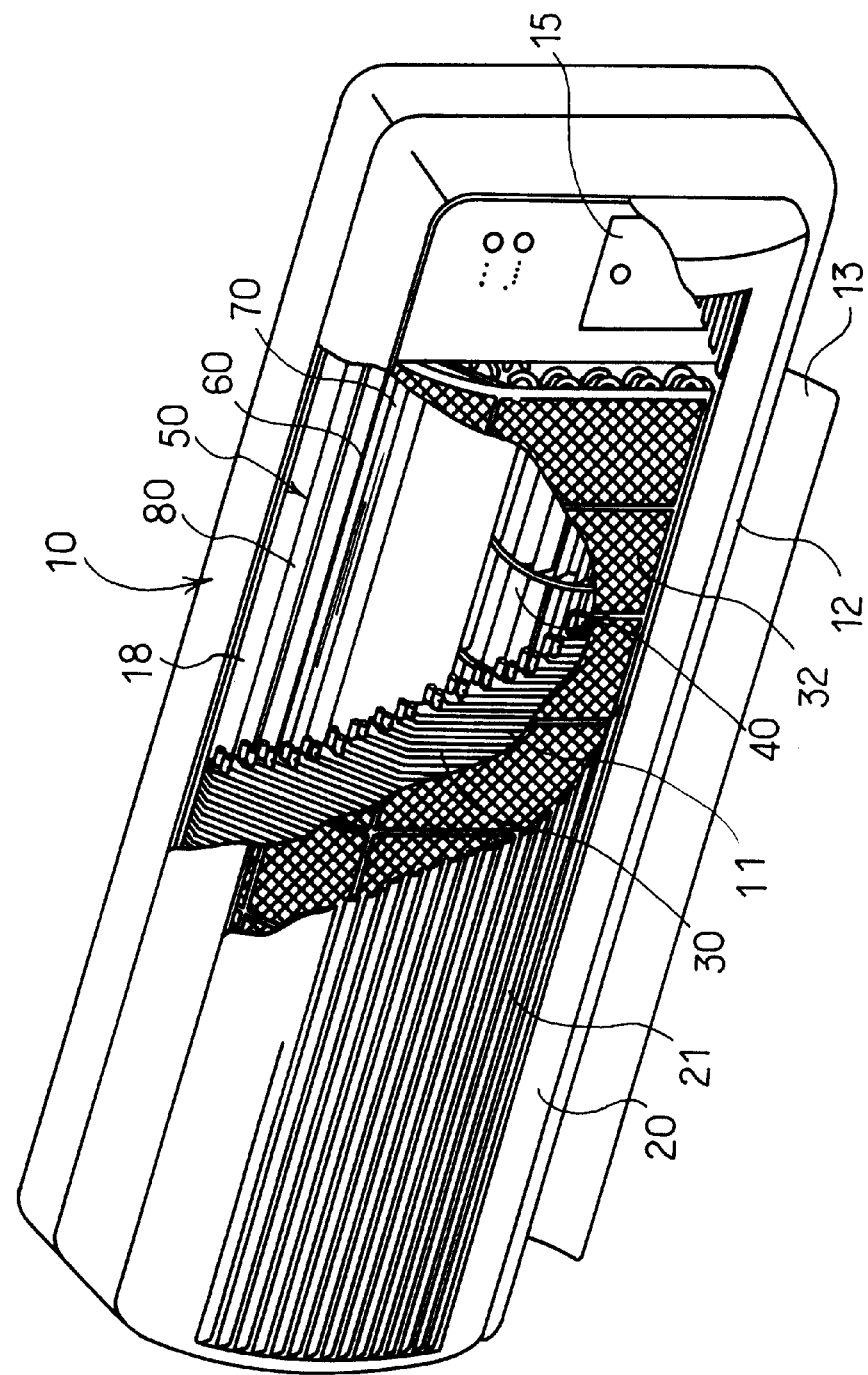
FIG. 1 is a partially broken perspective view of an air conditioner with electronic dust collector according to an embodiment of the present invention.

Referring to FIG. 1 through FIG. 5, an air conditioner with dust collector 1 has both an air conditioning function for cooling or heating air in room and a dust collection function for removing dust contained in interior air to clean the air passing therethrough. The device is to be fixed to wall or the like through a fixing plate 2. The air conditioner 1 has a casing 10 having an air inlet 11 on its front face. Casing 10 also includes an air outlet port 12 at the bottom of casing 10. A front panel 20 having a front grill 21 is fitted over the air inlet 1 1 of the casing 10. A heat exchanger 30 in the casing 10 faces the inlet 11 of the casing 10. A cross-flow type fan 40 behind the air outlet port 12 circulates air from the air inlet 11 to the air outlet port 12. The air passes through the heat exchanger 30, and an electronic dust collector 50 disposed in the air passage 31 behind the heat exchanger 30. A filter 32 is disposed between the front panel 20 and the heat exchanger 30. An angle adjusting type looper 13 at the air outlet port 12 of the casing 10 directs the outgoing air at a selectable angle. A control circuit 15 (control means) in the casing 10 controls the operation of the air conditioner 1. The heat exchanger 30 is connected to a heat exchanger of an external unit (not illustrated) and a coolant pipe.

The electronic dust collector 50 includes a horizontally stretched linear discharge electrode 60 and a bar-like dust collection electrode 70 spaced a predetermined distance from the discharge electrode 60. The dust collection electrode 70 contains a sheathed heater 71 for self-cleaning. A heat shielding plate 80 serves as a dust collector plate for shielding heat of the sheathed heater 71 of the dust collection electrode 70. The discharge electrode 60 and the dust collection electrode 70 are mounted to the heat shielding plate 80. The discharge electrode 60 and the dust collection electrode 70, with the heat shielding plate 80, are fixed to the surface of a vertical back plate 18.

A discharge line 61 which constitutes a discharge electrode 60 is tensioned in place by a tensile spring 64 connected, at its outer end to an electrode 63. Electrode 63 is fixed to a holding member 62. A similar holding member 63 (not shown) fixes the other end of the discharge line 61. A voltage is applied from the electrode 63 through the tensile spring 64 to the discharge line 61.

The dust collection electrode 70 is disposed on the downstream side of the air passage 31 spaced a predetermined distance from the discharge electrode 60. Lengthwise end parts 72 of dust collection electrode 70 are fixed to holding members 74 by stopper members 73. Positive DC voltage and the negative DC voltage are applied to the discharge electrode 60 and the dust collection electrode 70, respectively, during air purification. The holding member 62 and the holding member 74 are fixed to the heat shielding plate 80.

The casing 10, which is the body of the air conditioner 1, can be grounded. Without grounding the casing 10 would be electrified by the electric line force produced by the corona discharge of the dust collector 50 disposed inside. This would cause soiling by adhesion of dust. To prevent this, the static electricity on the casing 10 is eliminated by grounding.

Figure 2:
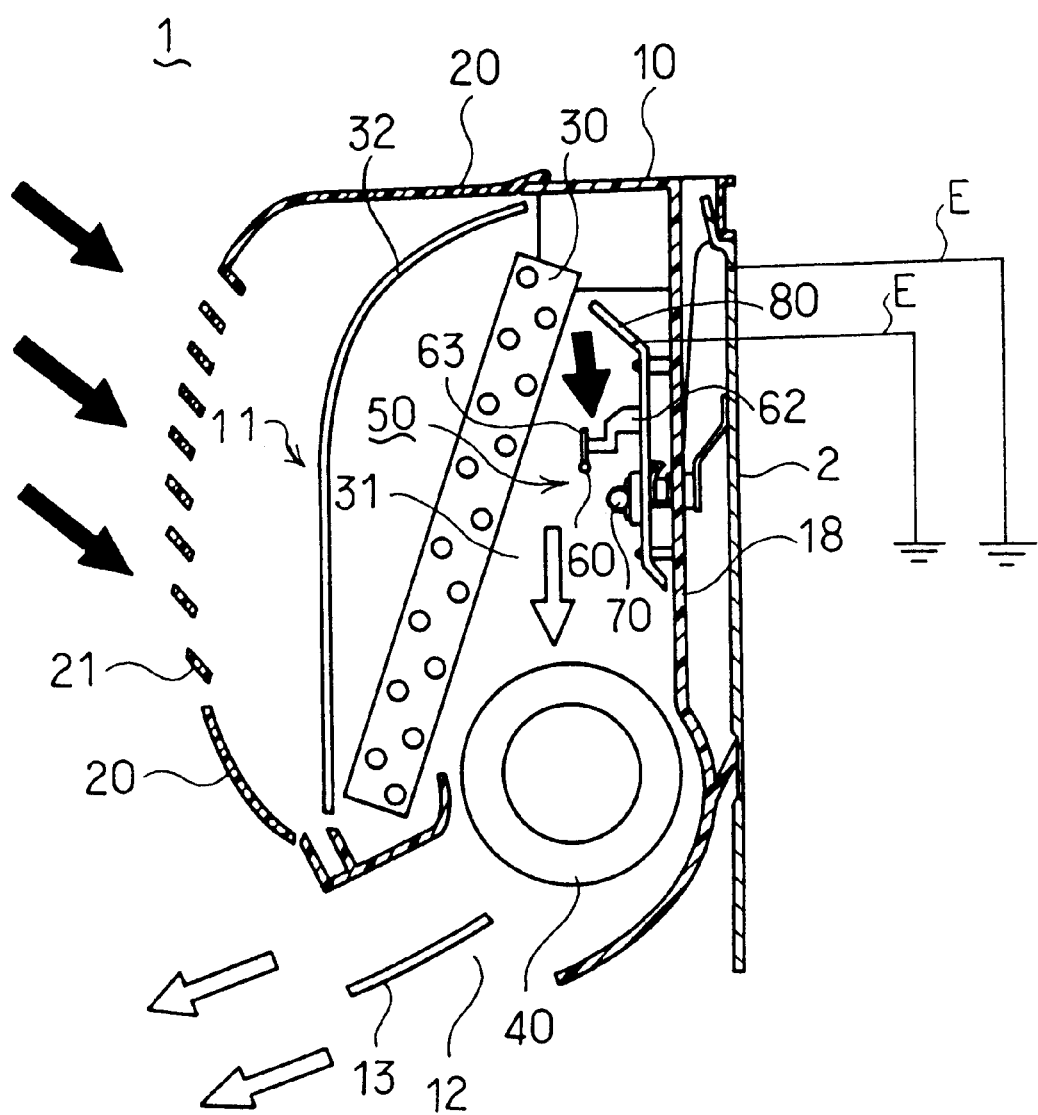
FIG. 2 is a side view of an air conditioner with electronic dust collector showing the flow of air during air conditioning.
Figure 3:
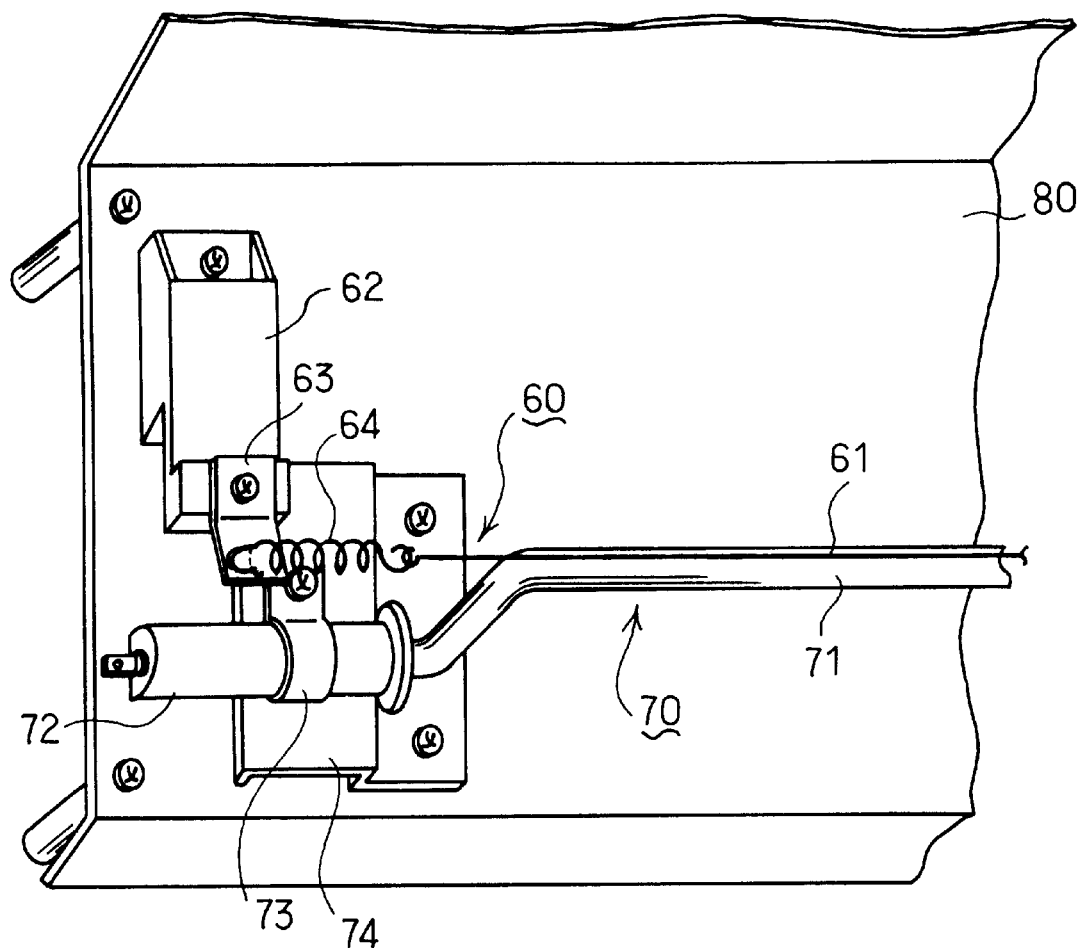
FIG. 3 is a partial perspective view of an electronic dust collector.
Figure 4:
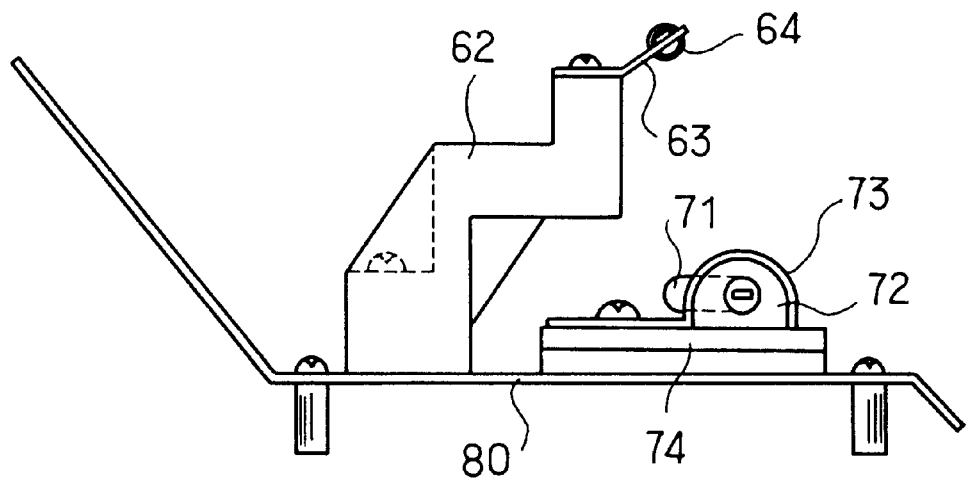
FIG. 4 is a partial side view of an electronic dust collector.
Figure 5:
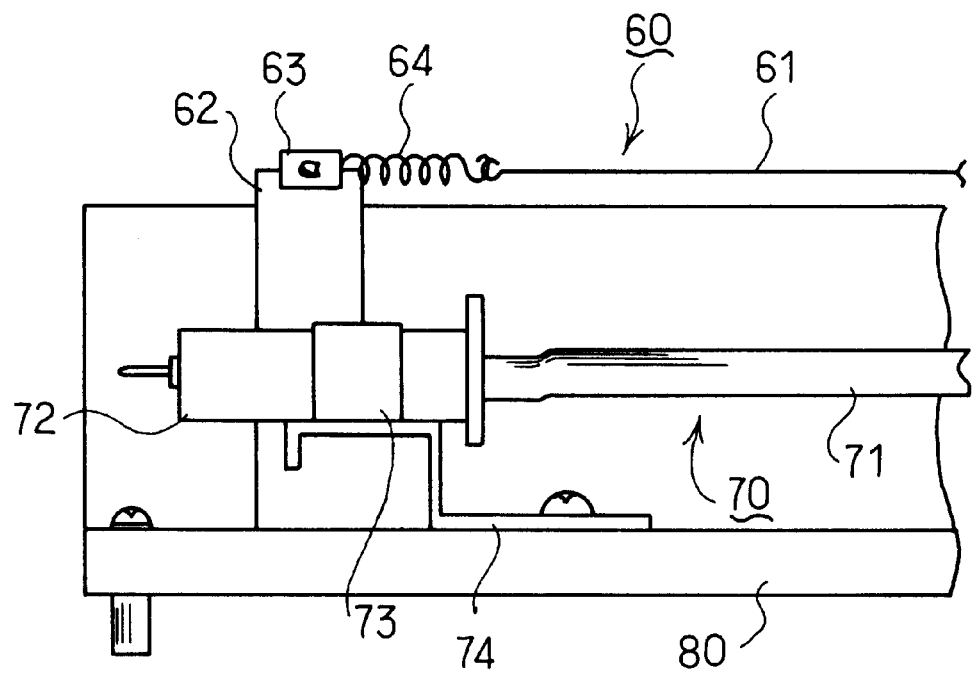
FIG. 5 is a partial bottom view of an electronic dust collector.

Although the casing 10 per se may be grounded, it is preferable that, as shown in FIG. 2, the fixing plate 2 and/or the heat shielding plate 80 are grounded by an earth line E. The grounding resistances are desirably small. It is believed that a grounding resistance of less than about 2 Ma may be acceptable.

Figure 6:
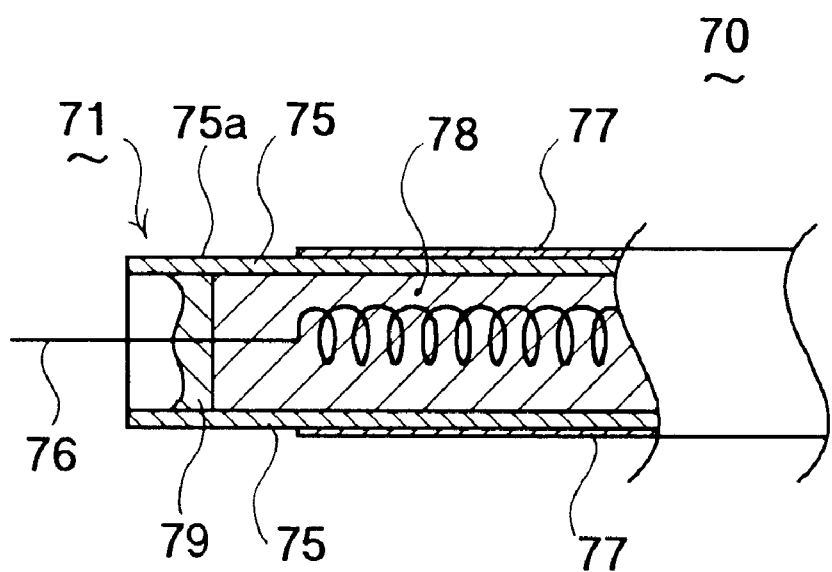
FIG. 6 is a sectional view of a part of the dust collector.

Referring now to FIG. 6, the dust collection electrode 70 self-contains the sheathed heater 71. The sheathed heater 71 includes an aluminum metal tube 75 containing an electric resistance line 76 therein. The surface of the metal tube 75 is coated with one or more catalyst layers 77. The catalyst layers 77 are preferably catalytic substances such as, for example, represented by zeolite, active alumina, manganese dioxide, etc. The catalyst layers 77 may be formed by any convenient means such as, for example, plating or welding. Zeolite (generally called zeolite) has a three-dimensional net structure having hollow parts, which accelerate the reaction of the molecules adsorbed to the inside of the hollow part. Active alumina ($Al_2O_3$) is alumina powder having high adsorption capacity, with small crystal particle size and large surface area. Active alumina is suitable as a catalyst, catalyst carrier, and adsorbing agent. Manganese dioxide ($MnO_2$) can function as a catalyst in the same manner as in zeolite and active alumina as stated above. Further, in order to prevent mutual contact between the metal tube 75 and the electric resistance line 76, an insulator such as magnesium oxide 78 fills the metal tube 75 and supports the electric resistance line 76 generally centered therein. End parts 75a of the metal tube 75 are sealed by glass sealing member 79 (only one of which is shown). This sheathed heater 71 may be of small energy per unit area, e.g., approximately 180 W (Watt).

Next, the operation of the air conditioner 1 with dust collector constituted as above is described. During air conditioning, operation of the heat exchanger 30 and the fan 40 passes room air inward through the front grill 21 of the front panel 20 and the filter 32, and into the casing 10. After being cooled or heated in the course of the passage through the heat exchanger 30, the air flows vertically downward through the air passage 31. The air which passes through the air passage 31 passes the periphery of the dust collector 50. Here, a high voltage is applied between the discharge electrode 60 and the dust collection electrode 70 of the dust collector 50 to generate a corona discharge between the two electrodes 60 and 70. As a result, dust such as fine particles of tar (oil smoke) of tobacco or cotton dust present in the air passing by the discharge electrode 60 has deposited thereon positive ions formed by the corona discharge. The fine particles and dust become positively charged. As a result, the fine particles and dust are attracted by Coulomb force between the two electrodes toward the negatively-charged dust collection electrode 70 where they are caught and removed from the air stream to effect electric dust collection.

If the fine particles in the air include odorous components, the odorous components are adsorbed by the catalyst layer 77 of the dust collection electrode 70 and deodorized. Thus, the air which passed through the heat exchanger 30 is purified in the course of passing through the air passage 31 on the back side thereof and discharged into the room through the air outlet port 12.

Because the dust collection electrode 70 is disposed to the lee side of the discharge electrode 60, the wind force of air flowing through the air passage 31 and the Coulomb force sustained by dust from the dust collection electrode 70, the dust is directed toward the dust collection electrode 70. This collecting a larger amount of dust on the dust collection electrode 70 to improve the dust collection effect by the dust collector 50.

Electricity is slowly increased to the heater 71 of the dust collection electrode 70 so as to increase its temperature slowly. As a result, dust of soot or cotton dust which adhered to the surface of the dust collection electrode 70 is gradually decomposed by oxidation under the catalytic action of the catalyst and finally converted to colorless, odorless carbon dioxide and vapor at about the temperature exceeding 300° C. and removed from the dust collection electrode 70. By oxidizing the dust slowly, the dust collection electrode 70 can be cleaned while suppressing generation of smoke and odor resulting from the firing of dust. The ultimate temperature is desirably controlled to a level lower than about 400° C. which is the lower limit of the firing temperature of the substances contained in the dust.

By grounding the fixing plate 2 of the casing 10 and/or the heat shielding plate 80 through the earth line E, static electricity charged thereon is eliminated. As a result, adhesion of dust and fine particles to these elements is suppressed to prevent their soiling. Further, by grounding the fixing plate 2, the casing 10 and the peripheral parts thereof are easily grounded by simply fixing the body of the air conditioner 1 to the fixing plate 2.

As used herein, the term air conditioner is taken to mean a device which performs any one of the functions of heating, cooling and cleaning air.

Without being limited to the foregoing embodiment, various modifications are feasible in the present invention. For example, in the above embodiment, there is shown about the self-cleaning of the electronic dust collection electrode provided on the air conditioner, but the invention may be applied to the reproduction method for the catalyst of the deodorizing apparatus of adsorptive type thermal decomposition system.

What is claimed is:

1. An air conditioner with electronic dust collector for conditioning air in a room and purifying air by collecting dust in air by the use of electric discharge effect comprising:
    a casing having an air suction port and an air outlet port;
    a heat exchanger in said casing facing said air suction port; a fan for circulating air into said suction port through air passages in said casing and said heat exchanger, and out said air outlet port;
    an electronic dust collector, having a discharge electrode and a dust collection electrode, in said air passages for collecting duct in air which passes through said air passages by using said electric effect;
    means for grounding said casing;
    said dust collection electrode spaced a predetermined distance from said discharge electrode;
    said predetermined distance being at least sufficient to permit application of a high enough voltage between said discharge electrode and said dust collection electrode to produce a corona discharge effective to ionize dust particles passing therepast;
    a heater associated with said dust collection electrode; and
    said heater being located in a position effective to enable self-cleaning said dust collection electrode.

2. The air conditioner with electronic dust collector according to claim 1, further comprising a catalyst layer on a surface of said dust collection electrode.

3. The air conditioner with electronic dust collector according to claim 1, wherein said dust collector is fixed to said casing through a dust collector fixing plate, and said dust collector fixing plate includes means for permitting grounding thereof.

4. The air conditioner with electronic dust collector according to claim 1, wherein said air conditioner body including said casing is fixable to a wall through a fixing plate, said fixing plate including means for permitting grounding thereof, and said casing being electrically connected to said fixing plate, whereby said means for grounding including electrical contact between said fixing plate and said casing.

5. The air conditioner with electronic dust collector according to claim 1, wherein said dust collector is fixed to said casing through a dust collector fixing plate, and said dust collector fixing plate includes means for permitting grounding thereof.

6. The air conditioner with electronic dust collector according to claim 2, wherein said air conditioner body including said casing is fixable to a wall through a fixing plate, said fixing plate including means for permitting grounding thereof, and said casing being electrically connected to said fixing plate, whereby said means for grounding including electrical contact between said fixing plate and said casing.

7. The air conditioner with electronic dust collector according to claim 2, wherein said dust collector is fixed to said casing through a dust collector fixing plate, and said dust collector fixing plate includes means for permitting grounding thereof.

8. An air conditioner with electronic dust collector for conditioning air in a room and purifying air by collecting dust in air by the use of electric discharge effect, comprising:
    a casing having an air suction port and an air outlet port;
    a heat exchanger in said casing facing said air suction port;
    a fan for circulating air into said suction port; through air passages in said casing and said heat exchanger and out said air outlet port:
    an electronic dust collector in said air passages for collecting dust in air which passes through said air passages by using said electric effect;
    means for grounding said casing;
    said casing is fixable to a wall through a fixing plate;
    said fixing plate including means for permitting grounding thereof; and
    said casing being electrically connected to said fixing plate, whereby said means for grounding includes electrical contact between said fixing plate and said casing.

9. An air conditioner with electronic dust collector for conditioning air in a room and purifying air by collecting dust in air by the use of electric discharge effect comprising:
    a casing having an air suction port and an air outlet port;
    a heat exchanger in said casing facing said suction port;

a fan for circulating air into said air suction port, through air passages in said heat exchanger and said casing and out said air outlet port;

an electronic dust collector in said air passages for collecting dust in air which passes through said air passages by using said discharge effect;

means for permitting grounding of said casing;

said dust collector is fixed and electrically contacted to said casing through a dust collector fixing plate; and said dust collector fixing plate includes fixing plate grounding means for permitting grounding thereof.

10. The air conditioner with electronic dust collector according to claim 9, wherein said dust collector includes a discharge electrode and a dust collection electrode spaced apart a predetermined distance, said predetermined distance being effective to sustain application of sufficiently high voltage to produce a corona discharge; and a heater associated with said dust collection electrode; and said heater being heatable to a temperature sufficient to effect self-cleaning of said dust collection electrode.

11. The air conditioner with electronic dust collector according to claim 10, wherein said dust collector is fixed to said casing through a dust collector fixing plate, and said dust collector fixing plate includes means for permitting grounding thereof.

12. The air conditioner with electronic dust collector according to claim 10, further comprising a catalyst layer on a surface of said dust collection electrode.

13. The air conditioner with electronic dust collector according to claim 12, wherein said dust collector is fixed to said casing through a dust collector fixing plate, and said dust collector fixing plate includes means for permitting grounding thereof.

14. The air conditioner with electronic dust collector according to claim 9, wherein said dust collector fixing plate includes a heat shielding plate holding said discharge electrode and said dust collection electrode.

15. The air conditioner with electronic dust collector according to claim 9, further comprising:

said electronic dust collector including a discharge electrode;

a dust collection electrode spaced a predetermined distance from said discharge electrode;

a heater associated with said dust collection electrode; and said heater being gradually heated at a rate effective to carbonize dust adhering to said dust collection electrode before said dust is burned.

16. The air Conditioner with electronic dust collector according to claim 15, wherein said heater is heated to a temperature no higher than 400° C.

17. The air conditioner with electronic dust collector according to claim 16, wherein said dust collector electrode is slowly heated to a temperature no higher than 300° C., and then heated to said temperature no higher than 400° C.

* * * * *